Patented Jan. 2, 1940

2,185,649

UNITED STATES PATENT OFFICE 2,185,649

FOIL PRODUCT

Gustav Ruoff, Cologne, Germany, assignor to California Fruit Growers Exchange, Los Angeles, Calif., a corporation of California No Drawing. Application September 5, 1934, Serial No. 742,863. In Germany September 16, 1933

6 Claims. (Cl. 154—46)

This invention relates to foils of any suitable material such as metal, said foils being provided with a layer of pectic material, which material has the function of tending to close the pores and may also impart certain adhesive properties. The end product is a material useful in preventing or retarding the weeping of marmalades, and the like, and for the protection of other perishable goods.

Accordingly, an object of this invention is to provide and disclose methods and means for making a foil bearing a layer of pectic material.

Further objects are to provide methods and means for the preparation of foils of metal, paper, or other similar material, provided with a layer of pectic substances.

Other objects are to provide foils of metal, paper and the like, with a layer or coating tending to render them non-porous, gas-tight, and adhesive.

Other objects will be in part explicitly set forth hereinafter, and in part will appear from a contemplation of the invention as described herein.

The material can be produced commercially in any suitable or desirable form, as for example, in leaves, strips, in the form of bags, containers, etc. The material has the purpose and function of tending to render foils, such as metal foils, non-porous and gas-tight, and to impart adhesive properties to the same, so that these foils adhere to any desired object, as for example, to preserve glasses, or other receptacles, giving them a substantially air-tight closure without the assistance of any other protective medium.

These foils have the added object, purpose, function and advantage that they restrain the weeping or syneresis of products such as marmalades and jellies. They are useful in connection with numerous other goods, such as candies and other food products, cigarettes, and other tobacco products, and other articles, which they protect from air and dust, and other undesirable influences.

Moreover, by the layer or film of pectin or other suitable pectic substances, the foil is given greater strength. This is an additional object and advantage of the invention.

The new material consists, in a preferred embodiment, of metal foil of aluminum or any other suitable metals or alloys, which foil is coated on one or both sides with a film of pectin or other suitable pectic substances, which, in turn, can be provided with substances or other added materials in order to impart to the material composing the film particular properties.

For the purposes of this description, pectin will be used as the illustrative and preferred embodiment, although it will be obvious to those skilled in the art that the spirit of the invention is not limited thereto, but may include other suitable pectic substances.

Preferably the foil of aluminum, or of whatever metal is employed, is provided on one side, or on both sides, with a pectic film or layer, which in turn may be provided, if desired, with another film or layer, or other material. Depending on the use for which the material is intended, added substances may be used, as germicidal material of various sorts, for example, benzoic acid and its derivatives, formic acid, chloramines, and other materials. Substances can also be added to give the pectin film greater flexibility and elasticity, or any other suitable properties.

A colorless, odorless, and tasteless pectin is especially suitable for use, however, I find that a pectin extract from apples can be employed, as well as other suitable pectin-containing extracts.

It is obvious that the pectin will most suitably be employed in the form of a solution such as an aqueous solution. This solution may be made up in any desired manner, and of suitable concentration, depending on the manner in which the film is to be applied and the thickness of film which it is desired to secure. These variations are matters which would be obvious to any person skilled in the art.

A suitable method of preparing the solution which I prefer to employ at the present time is as follows: 177 grams of 160-grade pectin, or an equivalent amount of pectin of other grade, are mixed with 1,300 grams of sugar. This mixture is suspended cold in 3,000 cubic centimeters of water. It may be heated to assist solution, but I prefer to allow it to stand with occasional stirring to insure complete dispersion of the pectin. After the pectin is completely dispersed, 188 grams of sodium benzoate, or any equivalent amount of other good preservative, is stirred in. This solution is a thick syrupy one. It should preferably be used within a few days, since on longer standing it may become deficient in rendering gas-tight the foil to which it is applied.

The pectin may be employed alone or in conjunction with the sugar only, although it seems that the presence of the sodium benzoate with the pectin imparts unexpectedly good preservative qualities and moreover it seems to assist in making a satisfactory gas-tight film on the material to which the mixture is applied.

The combining can take place in various ways. The pectin foil can be rolled or pressed or the putting on of the pectin film may suitably take place on adjustable rolls, which makes it possible to have the addition as thick as desired. Simultaneously with the application or pressing, designs, monograms, or other indicia may be impressed.

The metal foils can also be reinforced, that is strengthened, with parchment or other paper or cellulose derivative. The strengthening can also be accomplished by placing together two metal foils covered with pectin, or the combination may be effected in such a way that an inner pectin layer has different properties from an outer pectin layer. Finally the pectin-metal foil can be strengthened or otherwise reinforced with a metal foil cellulose derivative, paper, or the like, only at a definite place or places, as in the making of an air-tight bag or closure, or other package of this type, without the aid of any other binding material.

In using this material the foil may be placed so as to have the various layers in any desired relationship to the products with which it is used. Where it is used with the pectin layer on the inside, the intimate contact of the pectin layer with, for example, marmalades, protects them from weeping and from other damaging influences. Moreover, when moist, the foil takes on adhesive properties and gives an air-tight seal for the product in connection with which it is used, as for example, marmalade glasses or other type of food products or other container.

Having thus described my invention and the manner in which the same is to be prepared and used in such full, clear, concise, complete, and exact language as to enable others skilled in the art to make and use the same, I claim as my invention the following:

I claim:

1. A new foil material comprising two metal foils with a layer of pectin between, said layer being in intimate contact with both foils and adhering thereto, thereby binding them together and making the foil substantially non-porous and gas-tight.

2. A metal foil provided with at least one layer of pectin to make the foil substantially non-porous and gas-tight, to give it adhesiveness and greater strength.

3. A double foil comprised of a layer of metal foil, a layer of pectin, and a layer of paper material, the double foil being coated on at least one exterior surface with a layer of pectin.

4. A metal foil provided with at least one layer of pectin to make the foil non-porous and gas-tight and to give the foil adhesiveness and greater strength, at least one layer of the pectin containing sodium benzoate whereby the tightness of the completed foil to gas is improved.

5. A new foil material comprising a layer of metal foil and a layer of paper material with a layer of pectin between, said layer being in intimate contact with both foils and adhering thereto, thereby binding them together and making the foil substantially non-porous and gas-tight.

6. A double foil comprising at least one layer of metal foil, an interior layer of pectin, the double foil being coated on at least one exterior surface with a layer of pectin.

GUSTAV RUOFF.